Figure 1:
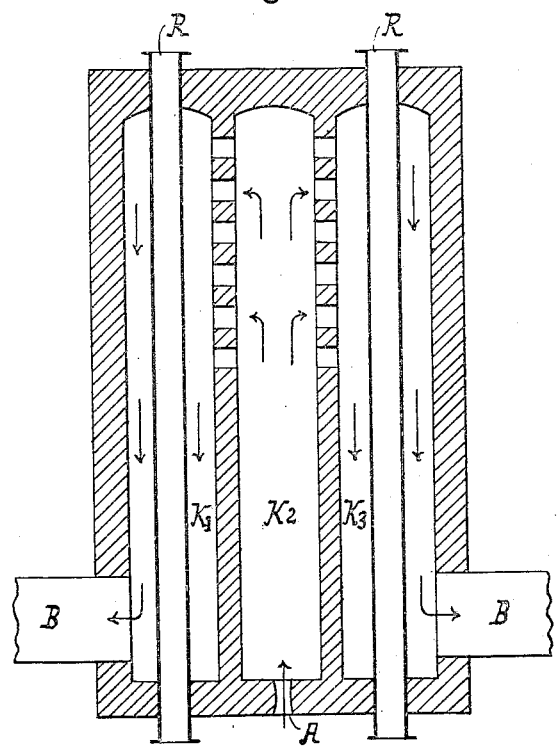

Jan. 10, 1933.  G. WIETZEL ET AL  1,894,140
APPARATUS FOR ENDOTHERMIC CATALYTIC REACTIONS
Filed Dec. 9, 1929

Inventors
Gustav Wietzel
Georg Schiller
By their Attorneys

Patented Jan. 10, 1933

1,894,140

UNITED STATES PATENT OFFICE

GUSTAV WIETZEL, OF LUDWIGSHAFEN-ON-THE-RHINE, AND GEORG SCHILLER, OF MANNHEIM, GERMANY, ASSIGNORS TO I. G. FARBENINDUSTRIE AKTIENGESELL-SCHAFT, OF FRANKFORT-ON-THE-MAIN, GERMANY

APPARATUS FOR ENDOTHERMIC CATALYTIC REACTIONS

Application filed December 9, 1929, Serial No. 412,752, and in Germany December 11, 1928.

The present invention relates to an apparatus for carrying out endothermic catalytic reactions.

Generally speaking endothermic catalytic reactions have hitherto been carried out in a periodic manner with the employment of heat accumulators. In many cases however a continuous manner of working is preferable, for example by heating the reaction chamber externally. This manner of working is employed especially for gas reactions for which heat-conducting catalysts are used; in this case the transference of heat from the walls of the reaction chamber to the gas to be converted is better than in cases in which the chambers are not filled with catalysts of this nature. The heating of the reaction chamber may be advantageously effected by means of firing gases. Since however it is difficult to heat a large chamber externally so that a sufficiently rapid replacement of the heat used up in the interior takes place, the chamber is subdivided into a number of tubes or chambers or the like. Even in this case however the amount of heat transferred from the heating gases to the walls of the reaction chamber and to the interior thereof is generally speaking still too small, since the transference of heat takes place mainly by convection.

We have now found that the transference of heat when carrying out endothermic catalytic reactions takes place very satisfactorily when care is taken that the heating of the reaction chamber is effected exclusively or mainly by heat radiation. This may be advantageously attained by carrying out the heating of the reaction vessel by means of heat radiating surfaces; these may be arranged on one or more sides outside the reaction vessel, if necessary, so that the chamber containing the catalyst is completely surrounded. In this manner a radiation of heat from the surfaces, which are heated by means of heating gases or in some other manner, for example by an electric current, to the walls of the reaction chamber takes place. As heat radiating surfaces of this kind may be mentioned, for example, the walls or crowns of the furnaces used for burning the heating gases, which are constructed of fireproof material, and care is taken by appropriate leading of the heating gases and arrangement of the reaction vessel with respect to the walls of the furnace that the amount of heat radiated to the walls of the reaction chamber from the walls of the furnace is greater than the amount of heat transferred by the direct contact of the heating gases with the same. The walls of the furnace may be constructed as lattices in order to increase the heat radiating surface area. The efficiency of these surfaces may be still further increased when materials are employed for their manufacture which have a high heat absorptive or heat emitting power, preferably those which in this respect approximate as closely as possible to an absolutely black body and which at the same time are stable to heat, for example metals or metal oxides, in particular those of the iron group. The surfaces may be prepared entirely or only partly of the said materials, for example, they may be provided with a coating of these materials.

Figure 2:
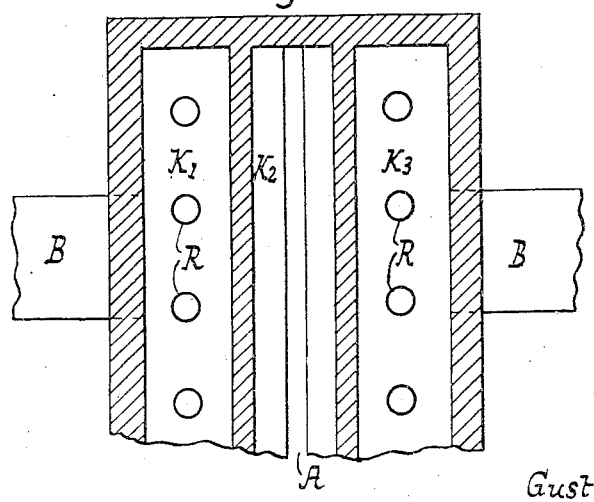

The nature of the invention will be further described with reference to the accompanying drawing which shows in longitudinal section in Figure 1 and in cross-section in Figure 2 an arrangement of apparatus according to this invention, but the invention is not restricted to this arrangement.

A furnace for heating 10 contact tubes R consists of three chambers $K_1$, $K_2$ and $K_3$ about 0.5 meter in width, 2.5 meters in length and 3 meters in height. The central chamber $K_2$ serves as the combustion chamber for the heating gases which enter through an opening A. The upper part of the walls between the three chambers consists of lattice-like brickwork. The heating gases pass upwards through the central chamber $K_2$, heat the walls between the chambers and pass through the brickwork lattice into the chambers $K_1$ and $K_3$ in each of which catalyst tubes R are arranged in alignment. The heating gases flow downwards in the chambers $K_1$ and $K_3$ past the said catalyst tubes R and flow out below through passages B. The heat necessary for heating the catalyst tubes is partly transferred by the gases flowing past them, but to the greater part is supplied by heat radiation from the hot walls between the three chambers. In consequence of the fact that the catalyst tubes are arranged in alignment, all the tubes are very uniformly heated.

This arrangement of apparatus may be advantageously employed for example for the catalytic conversion of methane and steam into carbon monoxide and hydrogen or for thermal decompositions of organic compounds, for example methane, which proceed endothermically.

The amount of heat which can be transferred by heat radiation according to the present invention is in many cases a multiple of the quantity of heat which can be transferred mainly by convection even with the most satisfactory leading of the heating gases. The advantageous consequence of this is that in many cases considerably greater throughputs can be obtained through the reaction chamber than by the employment of the kinds of heating hitherto used; in many cases the industrial conduction of strongly endothermic reactions, in particular gas reactions, is for the first time rendered remunerative by the process in accordance with the present invention.

What we claim is:—

1. Apparatus for carrying out endothermic catalytic reactions comprising a furnace, two walls of heat resistant material and of a high heat emitting power, said walls dividing said furnace into three chambers, an opening in the middle chamber for leading into said chamber a combustible gas mixture, apertures in said walls at the end opposite to said opening and connecting said middle chamber with the two adjacent chambers, catalyst tubes passing through said adjacent chambers and passages through the outer walls of said adjacent chambers at the end opposite to said apertures for leading off the combustion gases.

2. Apparatus for effecting catalytic gas reactions comprising a furnace, a pair of spaced heat resisting, heat emitting vertical partitions having a greater extension in the horizontal direction than in the vertical arranged in said furnace, subdividing the same into inner and outer compartments, vertical catalyst tubes arranged in a row in the outer compartments, said inner compartment having an adit for a combustible gas adjacent one end thereof, said partitions having a plurality of apertures at the end opposite the end of the inner compartment having said opening, whereby the hot gas formed in said inner chamber passes along the face of said partitions defining the inner chamber, thence into said outer chambers and along the catalyst tubes and faces of said partitions defining these chambers.

3. An apparatus as in claim 1, wherein said heat emitting material of the furnace walls comprises an oxide of the iron group.

In testimony whereof we have hereunto set our hands.

GUSTAV WIETZEL.
GEORG SCHILLER.